(12) United States Patent
Henderson (10) Patent No.: US 8,059,346 B2
(45) Date of Patent: Nov. 15, 2011

(54) LINEAR DRIVE SYSTEMS AND METHODS THEREOF

(75) Inventor: David A. Henderson, Farmington, NY (US)

(73) Assignee: New Scale Technologies, Victor, NY (US)

( * ) Notice: Subject to any disclaimer, the term of this patent is extended or adjusted under 35 U.S.C. 154(b) by 226 days.

(21) Appl. No.: 12/051,686

(22) Filed: Mar. 19, 2008

(65) Prior Publication Data

US 2008/0231970 A1    Sep. 25, 2008

Related U.S. Application Data

(60) Provisional application No. 60/895,635, filed on Mar. 19, 2007.

(51) Int. Cl.
  *G02B 7/02* (2006.01)
(52) U.S. Cl. .......................................... 359/824
(58) Field of Classification Search .............. 359/696, 359/822–824, 827–830
  See application file for complete search history.

(56) References Cited

U.S. PATENT DOCUMENTS

| | | | |
|---|---|---|---|
| 3,656,422 A * | 4/1972 | Hess et al. | 359/824 |
| 3,957,162 A | 5/1976 | Soderqvist | |
| 4,057,327 A * | 11/1977 | Kumazawa | 359/696 |
| 4,195,243 A | 3/1980 | Thaxter | |
| 4,423,941 A | 1/1984 | Iwata et al. | |
| 4,894,579 A | 1/1990 | Higuchi et al. | |
| 5,225,941 A | 7/1993 | Saito et al. | |
| 5,229,679 A | 7/1993 | Higuchi et al. | |
| 5,325,010 A | 6/1994 | Besocke et al. | |
| 5,418,418 A | 5/1995 | Hirano et al. | |
| 5,568,004 A | 10/1996 | Kleindiek | |
| 5,589,723 A | 12/1996 | Yoshida et al. | |
| 5,633,763 A | 5/1997 | Suzuki et al. | |
| 5,675,444 A | 10/1997 | Ueyama et al. | |
| 5,768,016 A | 6/1998 | Kanbara | |
| 5,786,654 A | 7/1998 | Yoshida et al. | |
| 5,847,488 A | 12/1998 | Yoshida et al. | |
| 5,890,391 A | 4/1999 | Okada | |
| 5,912,527 A | 6/1999 | Karrai | |
| 5,917,267 A | 6/1999 | Miyazawa et al. | |
| 5,969,464 A | 10/1999 | Nakano et al. | |
| 6,042,587 A | 3/2000 | Polla et al. | |
| 6,047,135 A | 4/2000 | Hamada | |
| 6,051,909 A | 4/2000 | Shinke et al. | |
| 6,084,363 A | 7/2000 | Mizumoto | |
| 6,111,336 A | 8/2000 | Yoshida et al. | |

(Continued)

OTHER PUBLICATIONS

Eng et al., "Inexpensive, Reliable Control Electronics for Stick-slip Motion in Air and Ultrahigh Vacuum," Rev. Sci. Instrum. 67(2):401-5 (1996).

(Continued)

*Primary Examiner* — Scott J Sugarman
*Assistant Examiner* — Vipin Patel
(74) *Attorney, Agent, or Firm* — LeClairRyan (57) ABSTRACT

A drive system and methods thereof include at least one actuator assembly that detachably engages a moveable system and at least one control system. The control system voltage biases the actuator assembly in at least one direction at a rate which causes the at least one actuator assembly to slip with respect to the detachably engaged moveable system. The control system also voltage biases the actuator assembly in at least one other direction at a rate which causes the at least one actuator assembly to stick and move with respect to the detachably engaged moveable system.

29 Claims, 9 Drawing Sheets

U.S. PATENT DOCUMENTS

| | | | |
|---|---|---|---|
| 6,114,799 A | 9/2000 | Yoshida et al. | |
| 6,218,765 B1 | 4/2001 | Kawabe | |
| 6,246,151 B1 | 6/2001 | Nakano | |
| 6,288,848 B1* | 9/2001 | Shinohara et al. | 359/696 |
| 6,433,459 B1 | 8/2002 | Okada | |
| 6,545,389 B1 | 4/2003 | Yoshida | |
| 6,917,140 B2 | 7/2005 | Olin et al. | |
| 6,919,666 B2 | 7/2005 | Bartzke et al. | |
| 6,940,210 B2 | 9/2005 | Karrai et al. | |
| 6,941,571 B2 | 9/2005 | Kurita et al. | |
| 6,968,562 B2 | 11/2005 | Kurita et al. | |
| 7,099,093 B2 | 8/2006 | Jeong et al. | |
| 7,102,270 B2 | 9/2006 | Ito et al. | |
| 7,154,210 B2 | 12/2006 | Hoshino | |
| 7,184,371 B2 | 2/2007 | Kurita et al. | |
| 7,212,358 B2* | 5/2007 | Mattsson et al. | 359/824 |
| 7,446,963 B2* | 11/2008 | Lee et al. | 359/824 |

OTHER PUBLICATIONS

Niedermann et al., "Simple Piezoelectric Translation Device," Rev. Sci. Instrum. 59(2):368-9 (1988).

Pohl, "Dynamic Piezoelectric Translation Devices," Rev. Sci. Instrum. 58(1):54-7 (1987).

Renner et al., "A Vertical Piezoelectric Inertial Slider," Rev. Sci. Instrum. 61(3):965-7 (1990).

* cited by examiner

LINEAR DRIVE SYSTEMS AND METHODS THEREOF

This application claims the benefit of U.S. Provisional Application No. 60/895,635, filed Mar. 19, 2007, which is hereby incorporated by reference in its entirety.

FIELD OF THE INVENTION

This invention generally relates to drive systems and methods thereof and, more particularly, to piezoelectric, linear drive systems and methods thereof.

BACKGROUND

There is a rapidly expanding demand in a variety of different markets, such as in electronic consumer products, electronics locks, and medical devices, for motors that can move tiny optics and other devices with sub-micrometer precision. By way of example, in the electronic consumer products market, the size of mobile phone handsets continues to shrink while the demand for the inclusion of features, such as digital cameras, in the mobile phone handsets continues to grow. To cost effectively add a digital camera feature into these mobile phones, the digital cameras need to be about one tenth the volume and cost of stand alone digital cameras. Unfortunately, existing solutions for trying to meet these radical size and cost reduction requirements in digital cameras have been less than successful.

Some prior mobile phone handsets with digital cameras have used fixed optics. Unfortunately, these fixed optics do not meet most consumer expectations for adjustable focusing capabilities in digital cameras in mobile phone handsets.

Other prior mobile phone handsets have used miniaturized electromagnetic motors with their digital cameras to provide adjustable focusing capabilities, e.g. the ability to move a lens up to about 0.5 millimeters. In particular, voice coil motors are popular for use as the miniaturized electromagnetic motors in these digital cameras in the mobile phone sets. Voice coil motors are simple, inexpensive, and operate at relatively low voltage.

However, voice coil motors have reached the limit of their potential miniaturization and can not satisfy the emerging market demand for ultra-thin phones with more than two mega pixels image sensors. Additionally, even though these voice coil motors operate at relatively low voltage, they still use too much power. Further, these voice coil motors must be supported by fragile flexure guides and produce excessive position noise for optimal image capture when using two mega pixels or higher digital image sensors.

SUMMARY

A drive system in accordance with embodiments of the present invention includes at least one actuator assembly that detachably engages a moveable system and at least one control system. The control system voltage biases the actuator assembly in at least one direction at a rate which causes the at least one actuator assembly to slip with respect to the detachably engaged moveable system. The control system also voltage biases the actuator assembly in at least one other direction at a rate which causes the at least one actuator assembly to stick and move with respect to the detachably engaged moveable system.

A method for making a drive system in accordance with other embodiments of the present invention includes providing at least one actuator assembly that detachably engages a moveable system. At least one control system is coupled to the actuator assembly and voltage biases the actuator assembly in at least one direction at a rate which causes the actuator assembly to slip with respect to the detachably engaged moveable system. The control system also voltage biases the actuator assembly in at least one other direction at a rate which causes the actuator assembly to stick and move with respect to the detachably engaged moveable system.

A method for driving a moveable system in accordance with other embodiments of the present invention includes detachably engaging a moveable system with an at least one actuator assembly. At least one control system voltage biases the actuator assembly in at least one direction at a rate which causes the at least one actuator assembly to slip with respect to the detachably engaged moveable system and in at least one other direction at a rate which causes the at least one actuator assembly to stick and move with respect to the detachably engaged moveable system.

The present invention provides a linear drive system which effectively meets the radical size and cost reductions which are now required in a variety of different markets. For example, even ultra-thin camera phones can now incorporate a linear drive system which meets these requirements to drive automatic focus or optical zoom. Additionally, the present invention is able to provide a linear drive system with not only reduced size, but also fewer parts which helps to reduce the overall cost of the linear drive system. Further, the present invention reduces operating power by eliminating the need for a separate position sensors, limit stops, or limit switches and in a digital camera applications helps to reduce power by holding the lens assembly using zero power. Even further, the present invention provides a linear drive system which is acoustically quieter than prior linear drive systems.

DETAILED DESCRIPTION

A lens system 10 with a lens assembly 12 and a linear drive system 14 in accordance with embodiments of the present invention are illustrated in FIGS. 1A-3. The present invention provides a number of advantages including providing a linear drive system which effectively meets the radical size and cost reductions which are now required in a variety of different markets.

Referring more to FIGS. 1A-3, the lens system 10 includes a module 16 which substantially surrounds the lens assembly 12 and the linear drive system 14, although the lens system 10 could have other types of housings in other configurations. The module 16 includes a cover 18 with an opening 20 to the lens assembly 12, although other numbers and types of covers and openings could be used. In this particular embodiment, the dimensions of module 16 are 8.5×8.5×4.3 millimeters, although the module 16 could have other dimensions and shapes. The module 16 is sized and shaped to provide space to receive the linear drive system 14 with the lens assembly 12 nested inside, although the module could be sized and shaped to accept other systems, device, and components.

The lens assembly 12 includes a lens 22 and a casing 24 secured around an outer, side edge of the lens 22, although the lens assembly 12 could include other types and numbers of components including other types and numbers of lens in other arrangements. In this particular embodiment, the lens assembly 12 has a cylindrical shape with a diameter of 5.5 millimeters, although other lens assemblies which other shapes and dimensions could be used.

The linear drive system 14 provides a space which is substantially symmetric and conforms to an outer shape of the lens assembly 12, although the linear drive system 14 could engage the lens assembly in other manners. The linear drive system 14 supports and moves the lens assembly 12 parallel to and in either direction along the optical axis A-A when engaged by the drive control system 36, although other types and numbers of guide elements with other configurations could be used. The linear drive system 14 includes rails 26(1)-26(2), piezoelectric plates 28(1)-28(2), piezoelectric plates 30(1)-30(2), spring flexure supports 32(1)-32(2), and lens guide elements 34(1)-34(2), although the linear drive system 14 can include other types and numbers of components in other configurations.

The rails 26(1)-26(2) have a rectangular shape, are spaced apart, and are substantially parallel to each other, although other types and numbers of rails in other shapes and configurations could be used. In this particular embodiment, the rails 26(1)-26(2) are made of 303 stainless steel which is a strong, corrosion resistant and electrically conductive material, although other types of metals and polymers, such as polycarbonate by way of example only, could be used for the rails 26(1)-26(2).

Piezoelectric plate 28(1) is secured to one surface of the rail 26(1) and piezoelectric plate 28(2) is secured to an opposing surface of the rail 26(1), although other numbers and types of plates could be secured to the rail 26(1) in other manners. Piezoelectric plate 30(1) is secured to one surface of the rail 26(2) and piezoelectric plate 30(2) is secured to an opposing surface of the rail 26(2), although other numbers and types of plates could be secured to the rail 26(2) in other manners. The piezoelectric plates 28(1)-28(2) and 30(1)-30(2) are each bonded to the rails 26(1)-26(2), respectively, using high strength adhesive with all the poling directions aligned as shown by the arrows 29(1)-29(2) in FIGS. 2A and 2C, although other manners for securing the piezoelectric plates 28(1)-28(2) and 30(1)-30(2) and other poling alignments could be used. In this embodiment, the thickness of the securing adhesive is thin enough to insure direct electrical contact with negligible resistance between the piezoelectric plates 28(1)-28(2) and 30(1)-30(2) and the conductive rails 26(1)-26(2), although other bonding methods that are electrically insulating and other electrical connection methods may also be used.

The piezoelectric plates 28(1)-28(2) and 30(1)-30(2) are made of a hard piezoelectric ceramic with low dielectric losses at ultrasonic frequencies above 20,000 Hz, although piezoelectric plates 28(1)-28(2) and 30(1)-30(2) made out of other materials and with other types of properties could be used. In this embodiment, the piezoelectric material is a commonly available "hard" composition with low dielectric losses and high depoling voltage. Thus, by way of example only, one may use a piezoelectric material sold as "PZT-4" by the Morgan Matroc company of Bedsford, Ohio. This material typically has several important properties as described below, although the piezoelectric materials could have other properties.

This piezoelectric material has a dielectric loss factor of less than about 1 percent at a frequency greater than about 20,000 Hertz, although piezoelectric materials with other dielectric loss factors could be used, particularly lower dielectric loss factors are beneficial. For example, in another embodiment the piezoelectric material has a dielectric loss factor of less that about 0.5 percent at a frequency greater than about 20,000 Hertz and in yet another embodiment the piezoelectric material has a dielectric loss factor of about 0.4 percent at a frequency greater than about 20,000 Hertz.

Additionally, the piezoelectric material has a d33 piezoelectric charge coefficient of at least about 250 picoCoulomb/Newton's, although piezoelectric materials with other beneficial d33 piezoelectric charge coefficients could be used. For example, in other embodiments the piezoelectric material can have one of the following d33 piezoelectric charge coefficients of at least: 90 picoCoulomb/Newton's; 105 picoCoulomb/Newton's; 115 picoCoulomb/Newton's; 270 picoCoulomb/Newton's; and 285 picoCoulomb/Newton' s.

Further, the piezoelectric material is a single crystal piezoelectric material with a d33 piezoelectric charge coefficient of at least about 2500 picoCoulomb/Newton's, and a d31 piezoelectric charge coefficient of at least about 900 picoCoulomb/Newton's, although piezoelectric materials with other crystal structures and charge coefficients can be used.

In this particular embodiment, each of the piezoelectric plates 28(1)-28(2) and 30(1)-30(2) is about 0.2 millimeters thick, although the piezoelectric plates 28(1)-28(2) and 30(1)-30(2) could have other thicknesses and other shapes and dimensions. Additionally, in this particular embodiment the exposed outer surface of each of the piezoelectric plates 28(1)-28(2) and 30(1)-30(2) are coated with a conductive metal, although the piezoelectric plates 28(1)-28(2) and 30(1)-30(2) could be coupled to other types and numbers of conductors in other manners and locations. Further, in this particular embodiment the ceramic material from which the piezoelectric plates 28(1)-28(2) and 30(1)-30(2) are made in this example is poled to activate the piezoelectric properties, although piezoelectric could be activated in other manners.

The spring flexure supports 32(1)-32(2) are spaced apart form each other, are each secured at opposing ends to rails 26(1) and 26(2), and are sized to nest within the space for the lens assembly 12 the linear drive system 14 in module 16, although other types and numbers of force biasing elements could be used. The spring flexure supports 32(1)-32(2) generate a preload bias force that squeezes the guide elements 34(1) and 34(2) on opposite sides of the lens assembly 12 and precisely constrain the lens assembly 12 to move in a straight line substantially parallel to the optical axis A-A, although other force biasing systems configured in other manners and with other preloads could be used. The spring flexure supports 32(1)-32(2) have a low stiffness in the preload direction and high stiffness parallel to the optical axis A-A. By way of example only, in this particular embodiment the spring flexure supports 32(1)-32(2) generate a preload of about twenty grams on each side of the lens assembly 12 and the coefficient of friction of each of the guide elements 34(1)-34(2) is 0.2 which produces about eight grams of holding friction, although other amounts of preload and other coefficients of friction could be used. In this particular embodiment, the static friction is at least ten times greater than the mass of the lens assembly 12 so the focus position is maintained precisely with zero power.

The guide elements or devices 34(1)-34(2) are used to support and guide the lens assembly 12 parallel to the optical axis A-A, although other types and numbers of guide elements in other configurations could be used. Lens guide element 34(1) is secured to an inner surface of rail 26(1) and lens guide element 34(2) is secured to an inner surface of rail 26(2), although the guide elements can be secured in other manners and locations.

In this particular embodiment, the thickness of the lens assembly 12 is approximately 3.0 millimeters and the thickness of the linear drive system 14 is approximately 1.2 millimeters, although the lens assembly 12 and linear drive system 14 could have other dimensions. The total stroke is limited by the engagement of the guide elements 34(1)-34(2). In this particular embodiment, the maximum stroke is 3.0 millimeters–1.2 millimeters=1.8 millimeters, although the maximum stroke could be designed to have other dimensions. As illustrated by this example, the present invention provides the lens system 10 with the lens assembly 12 and the linear drive system 14 with a stroke which is much greater than the typical auto focus requirement of 0.4 millimeters in a very compact package.

Drive control system 36 is coupled to piezoelectric plates 28(1)-28(2) and piezoelectric plates 30(1)-30(2), although other types and numbers of control system can be coupled to other types and numbers of elements in other manners to drive the linear drive system 14. In this particular embodiment, connection Va from the drive control system 36 is coupled to the electrode on the exposed outer surface of piezoelectric plates 28(1) and 30(1) and connection Vb from the drive control system 36 is coupled to the electrode on the exposed outer surface of piezoelectric plates 28(2) and 30(2), although the drive control system 36 can be coupled to control the piezoelectric plates 28(1)-28(2) and 30(1)-30(2) in other manners. In this particular embodiment, the drive control system 36 applies a positive electric field by supplying a voltage ranging from about zero volts to thirty-three volts to the piezoelectric plates 28(1)-28(2) and 30(1)-30(2), although other ranges of voltages and other manners for bending the rails 26(1)-26(2) can be used. When the drive control system 36 applies this positive voltage bias and corresponding positive electric field (Va-Vb>0) the rails 26(1)-26(2) bend resulting in tens of nanometers of movement at the center of the rails 26(1)-26(2), although other manners for bending the rails 26(1)-26(2) can be used.

Examples of the operation of the lens system 10 with the lens assembly 12 and the linear drive system 14 in accordance with embodiments of the present invention will now be described with reference to FIGS. 1A-6. With the present invention, when a positive electric field (an electric field in the same direction as the poling voltage) is applied by drive control system 36 to the piezoelectric plates 28(1)-28(2) and 30(1)-30(2), the piezoelectric plates 28(1)-30(1) shrink in length and piezoelectric plates 28(2)-30(2) grow in length due to the D31 piezoelectric effect. The piezoelectric plates 28(1)-28(2) and 30(1)-30(2) on opposite sides of the linear drive system 14 have opposite polarity and strain which causes the rails 26(1)-26(2) to bend as shown in FIGS. 4B, 4C, 5, and 6. When the rails 26(1)-26(2) bend the movement is symmetrical with the centers of the rails 26(1)-26(2) moving in one direction and ends of the rails 26(1)-26(2) moving in the opposite direction, although the rails 26(1)-26(2) could be bent in other manners.

Figure 1A:
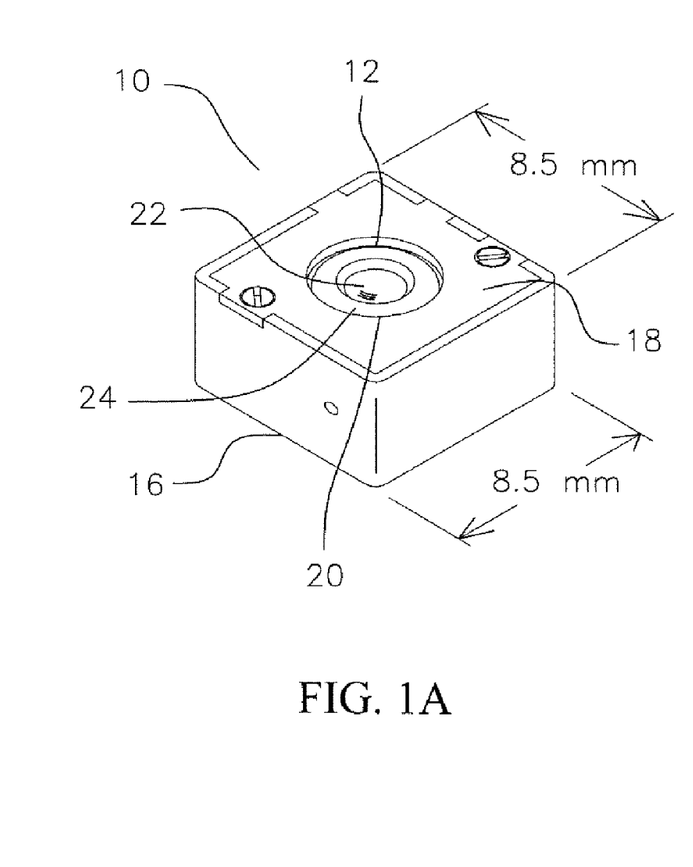
FIG. 1A is a perspective view of a lens system with a lens assembly and a linear drive system in accordance with embodiments of the present invention.
Figure 1B:
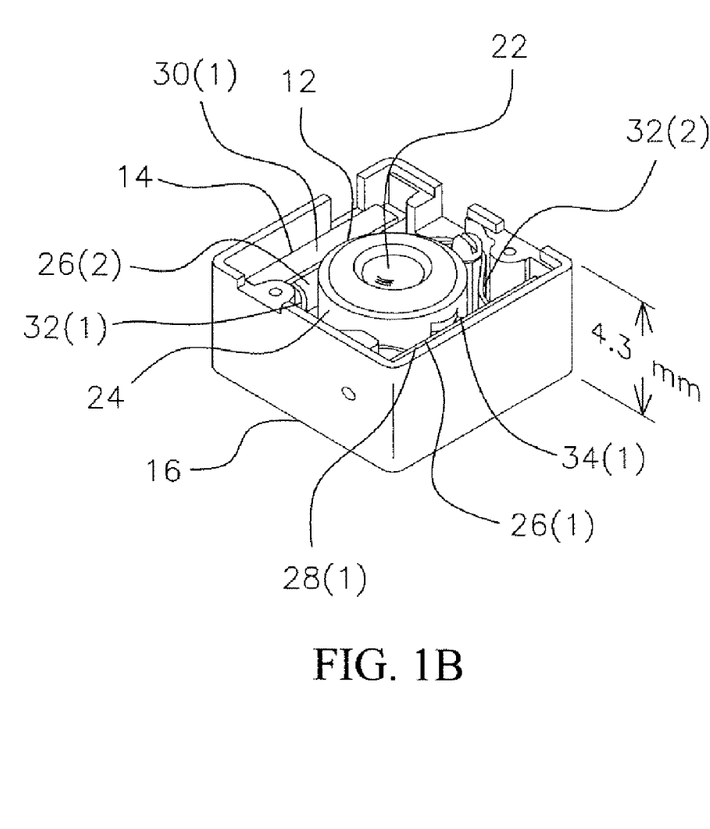
FIG. 1B is a perspective view of the lens system with the lens assembly and the linear drive system shown in FIG. 1A with a cover removed.
Figure 2A:
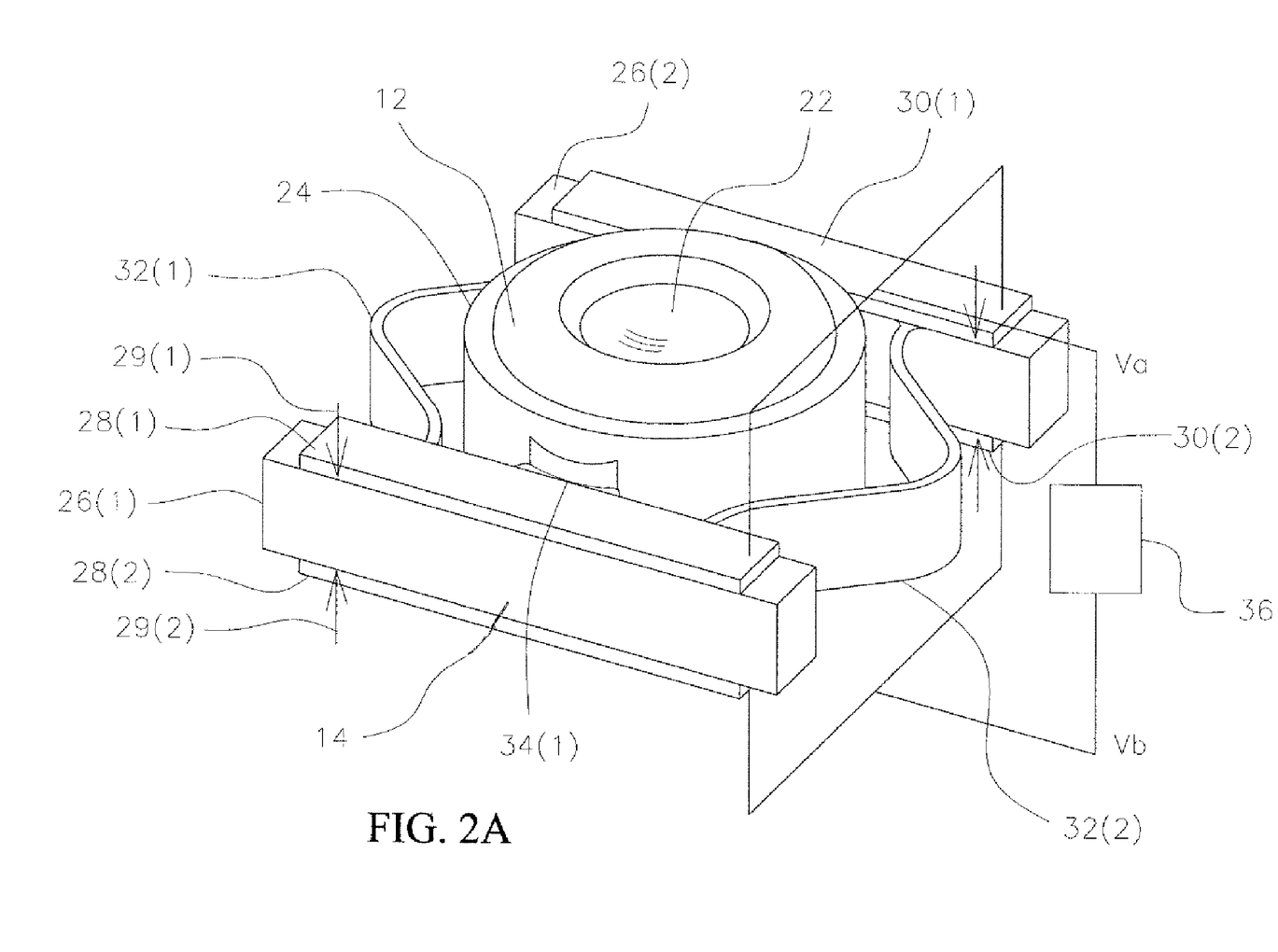
FIG. 2A is a perspective view of the linear drive system with the lens assembly and a drive control system with a lens housing removed.
Figure 2B:
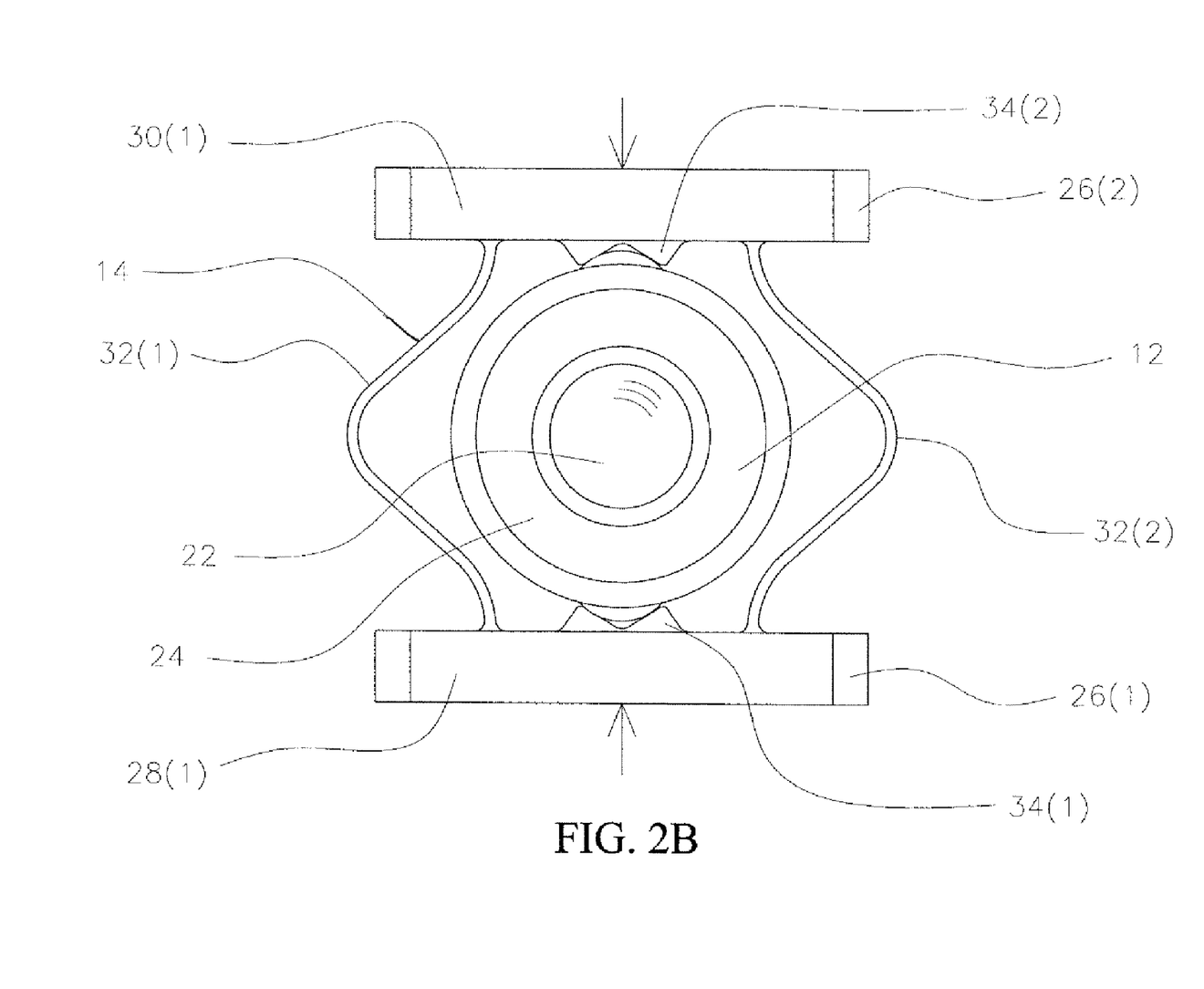
FIG. 2B is a top view of the linear drive system with the lens assembly shown in FIG. 2A and without the drive control system for ease of illustration.
Figure 2C:
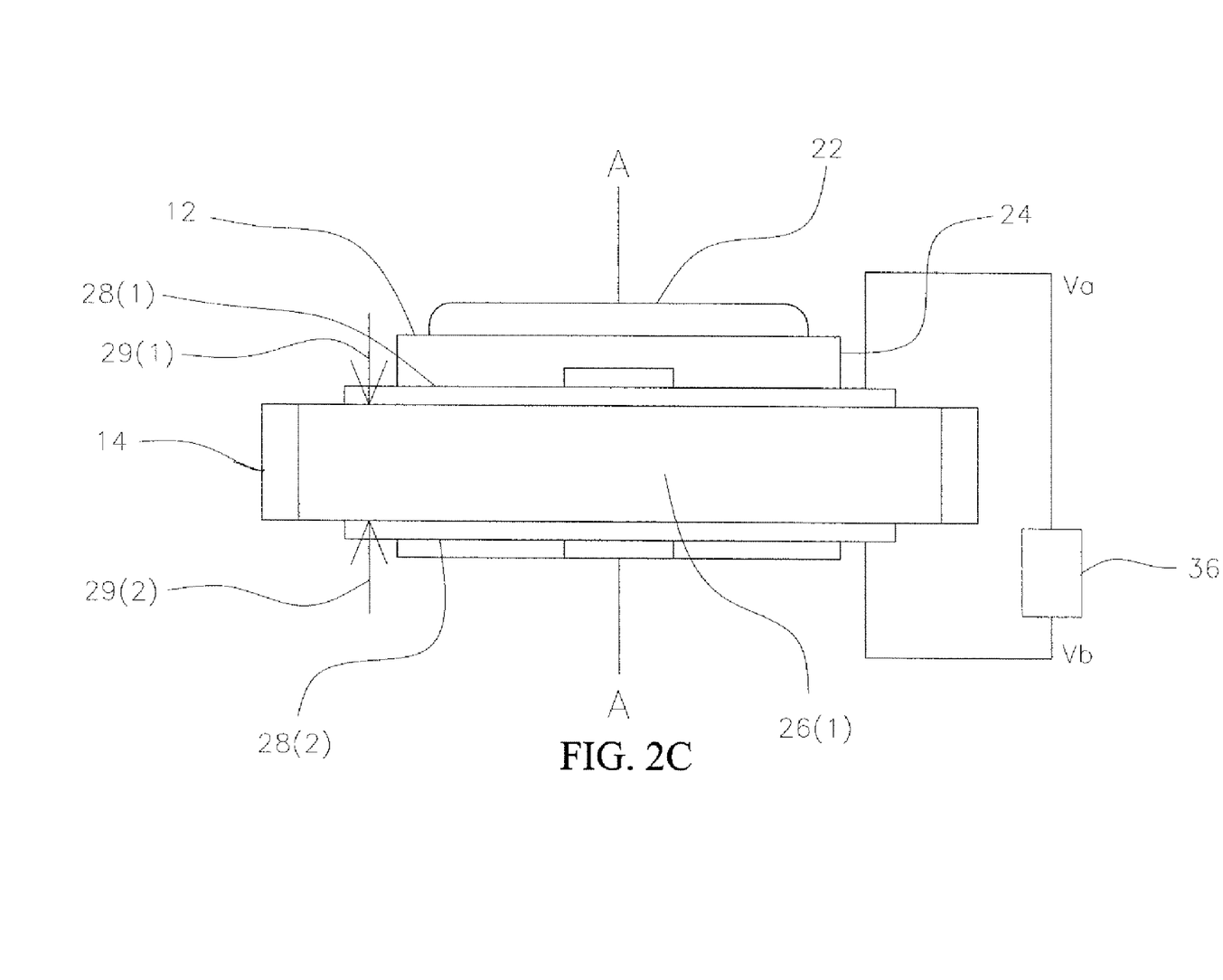
FIG. 2C is a side view of the linear drive system with the lens assembly and the drive control system shown in FIG. 2A.
Figure 2D:
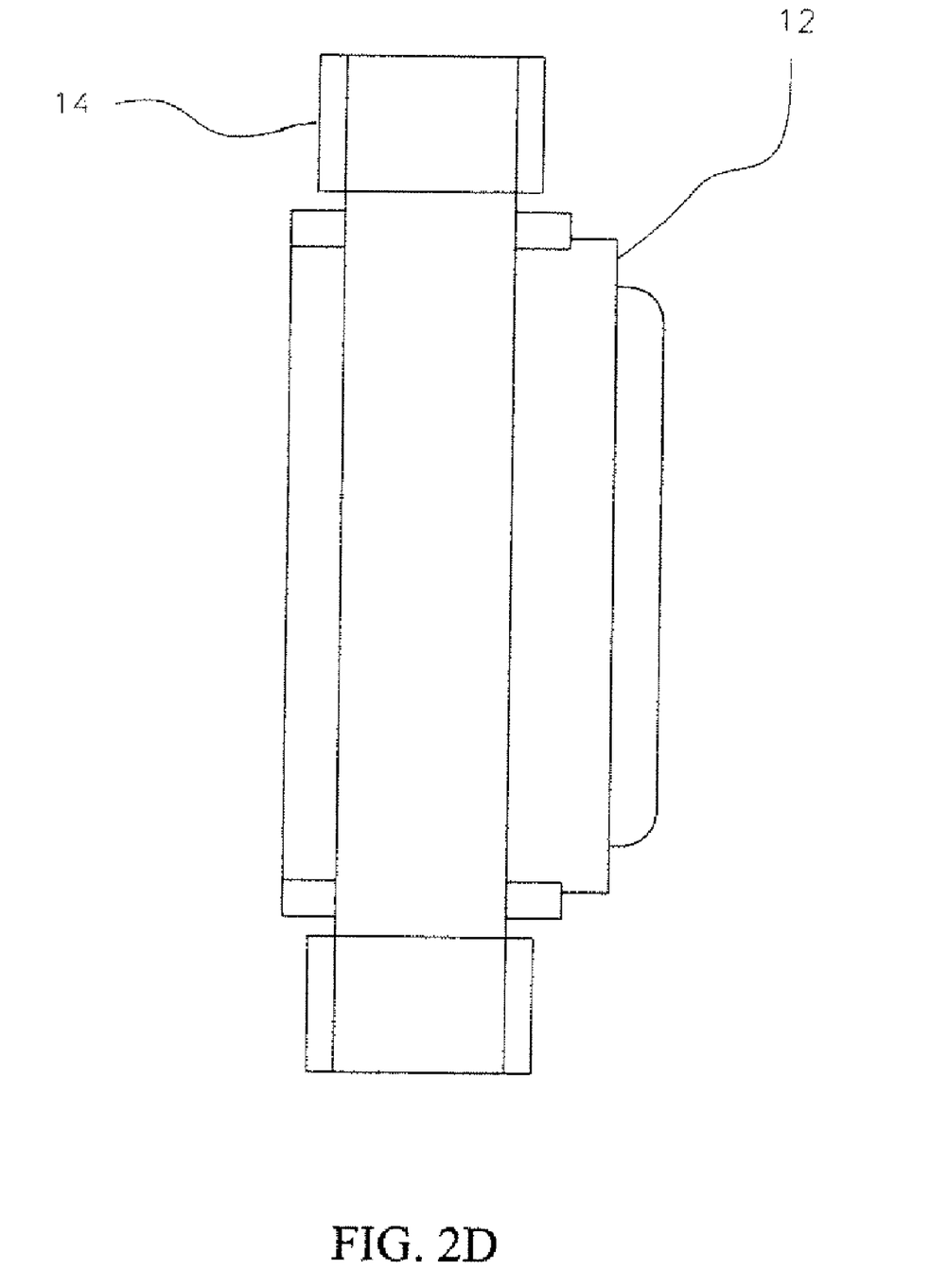
FIG. 2D is another side view of the linear drive system with the lens assembly and the drive control system shown in FIG. 2A.
Figure 3:
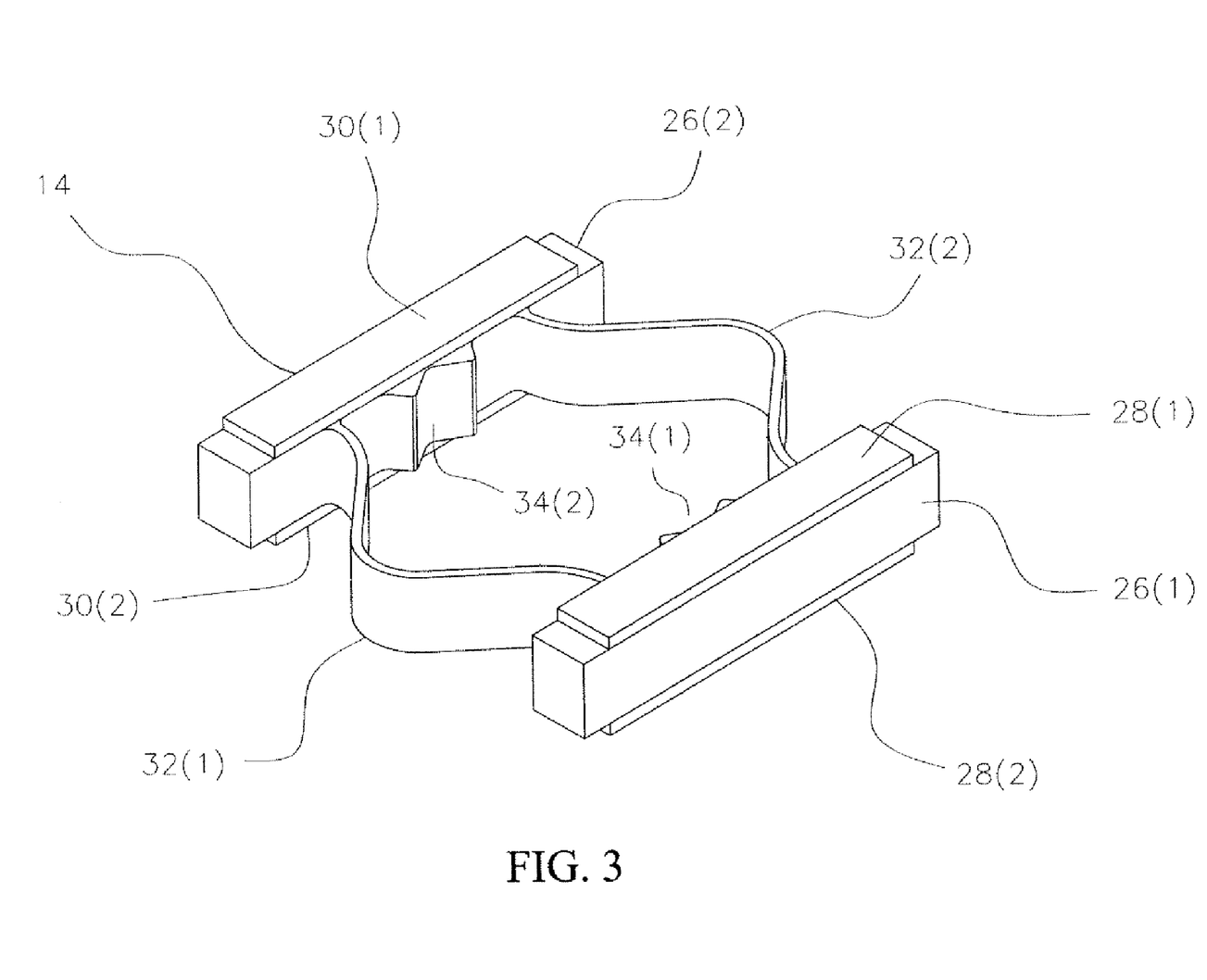
FIG. 3 is a perspective view of the linear drive system without the lens assembly.
Figure 4A:
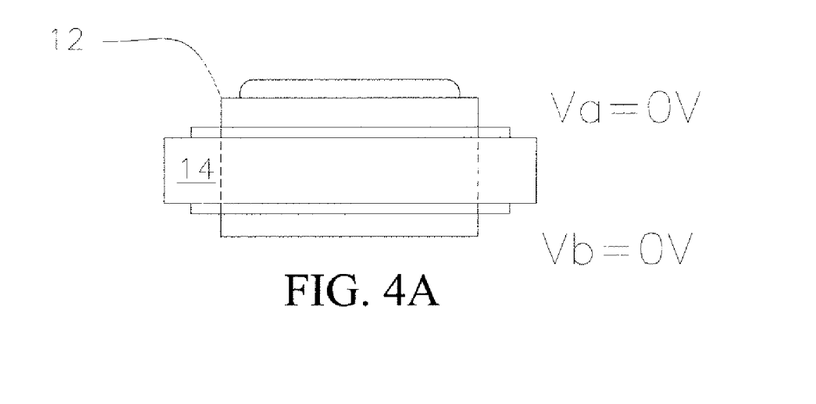
FIG. 4A is a side view of the of the linear drive system with the lens assembly in a stationary position.

More specifically, when the drive control system 36 does not supply a voltage to piezoelectric plates 28(1)-28(2) and 30(1)-30(2), the lens assembly 12 is held in place by the static friction produced by the preload from the spring flexure supports 32(1)-32(2) acting on the rails 26(1)-26(2) with the guide elements 34(1)-34(2) as shown in FIG. 4A. As discussed earlier, the static friction is at least ten times greater than the mass of the lens assembly 12 so with the present invention the focus position of the lens assembly 12 can be maintained precisely without expanding any power. This helps to reduce overall power consumption in the lens system 10.

Figure 4B:
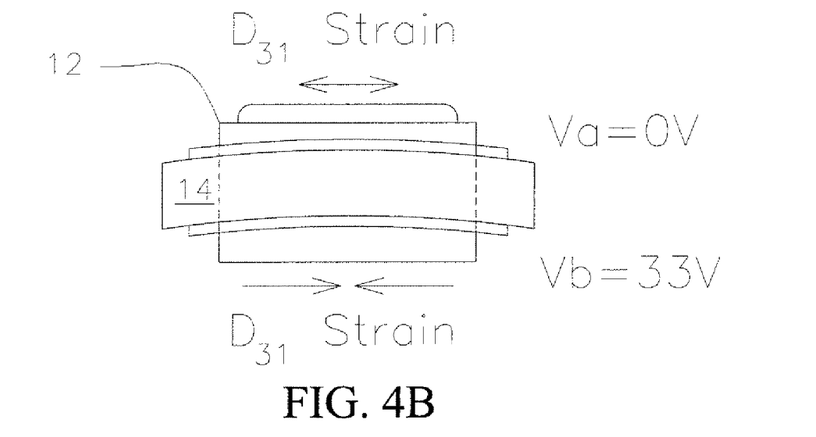
FIG. 4B is a side view of the of the linear drive system with the lens assembly in a fast movement/slip operation.

When the drive control system 36 applies a rapidly rising or falling voltage (Va-Vb) to piezoelectric plates 28(1)-28(2) and 30(1)-30(2), the application of the positive electric field causes the rails 26(1)-26(2) to rapidly bend. The rate of acceleration at which the rails 26(1)-26(2) rapidly bend is sufficient to overcome static friction between the guide elements 34(1)-34(2) and lens assembly 12. It is well understood to one of ordinary skill in the art that for most material surfaces the static friction is typically twice the dynamic friction. As a result, guide elements 34(1)-34(2) on rails 26(1)-26(2), respectively, slip relative to the lens assembly 12 as shown in FIG. 4B and also as shown at the designated "Slip" stages in FIGS. 5 and 6.

Figure 4C:
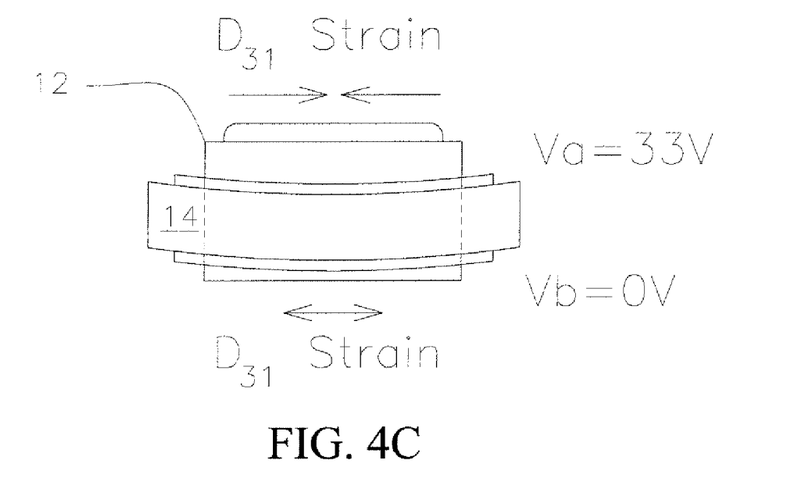
FIG. 4C is a side view of the of the linear drive system with the lens assembly in a slow movement/stick operation.

When the drive control system 36 applies a more slowly rising or falling voltage to piezoelectric plates 28(1)-28(2) and 30(1)-30(2), the application of the positive electric field causes the rails 26(1)-26(2) to bend at a slower rate. This slower rate of acceleration at which the rails 26(1)-26(2) bend is insufficient to overcome static friction between the guide elements 34(1)-34(2) on rails 26(1)-26(2), respectively, and lens assembly 12. As a result, the guide elements 34(1)-34(2) stick relative to the lens assembly 12 resulting in movement of the lens assembly 12 as shown in FIG. 4C and also as shown at the designated "Stick" stages in FIGS. 5 and 6. Accordingly, by combining these "Slip" and "Stick" stages in one vibration cycle the net movement of the lens assembly 12 with linear drive system 14 is generated.

Figure 5:
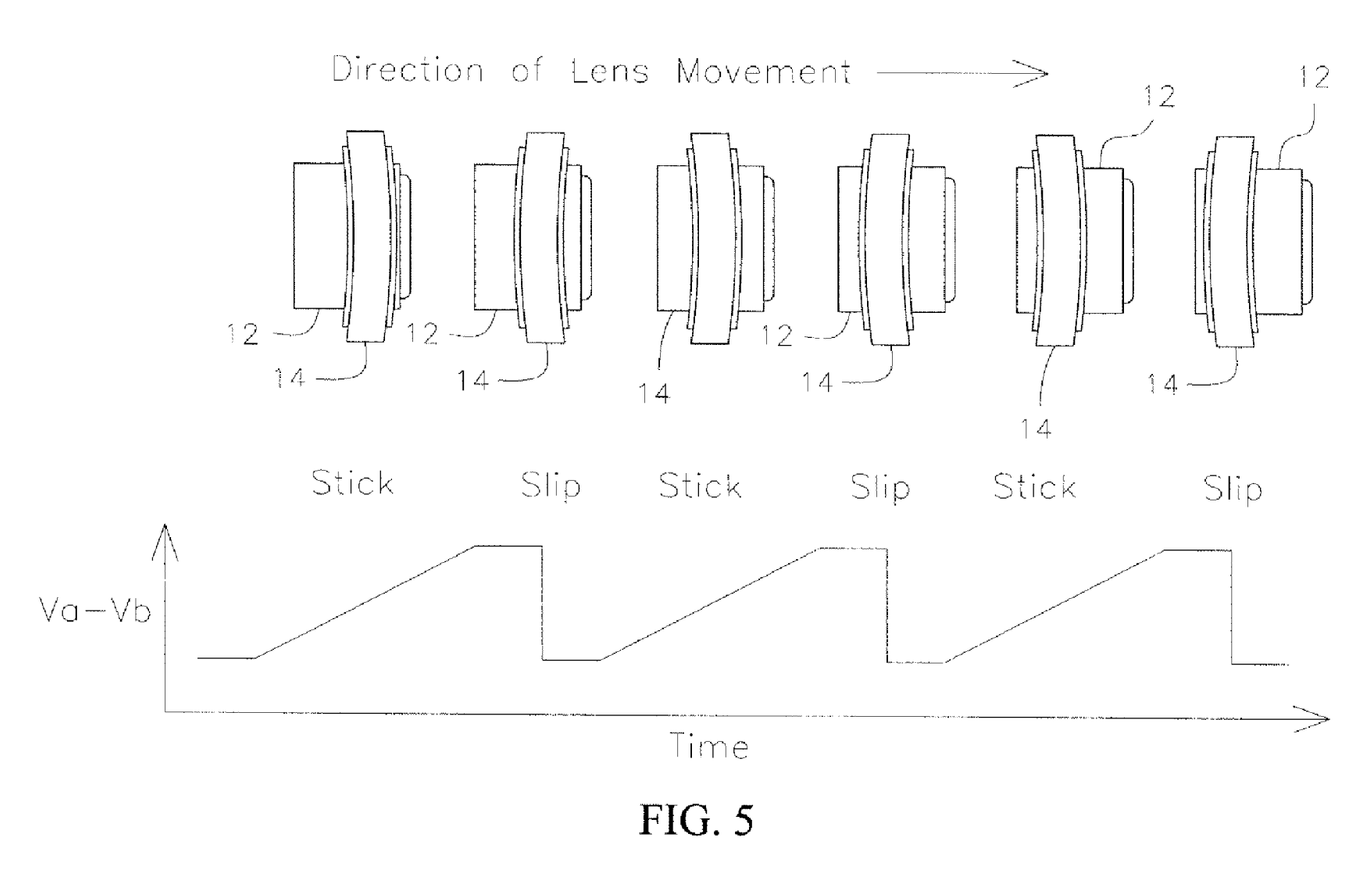
FIG. 5 is a timing diagram of a first drive waveform along with a series of side views illustrating the corresponding movement of the drive mechanism and the lens assembly.
Figure 6:
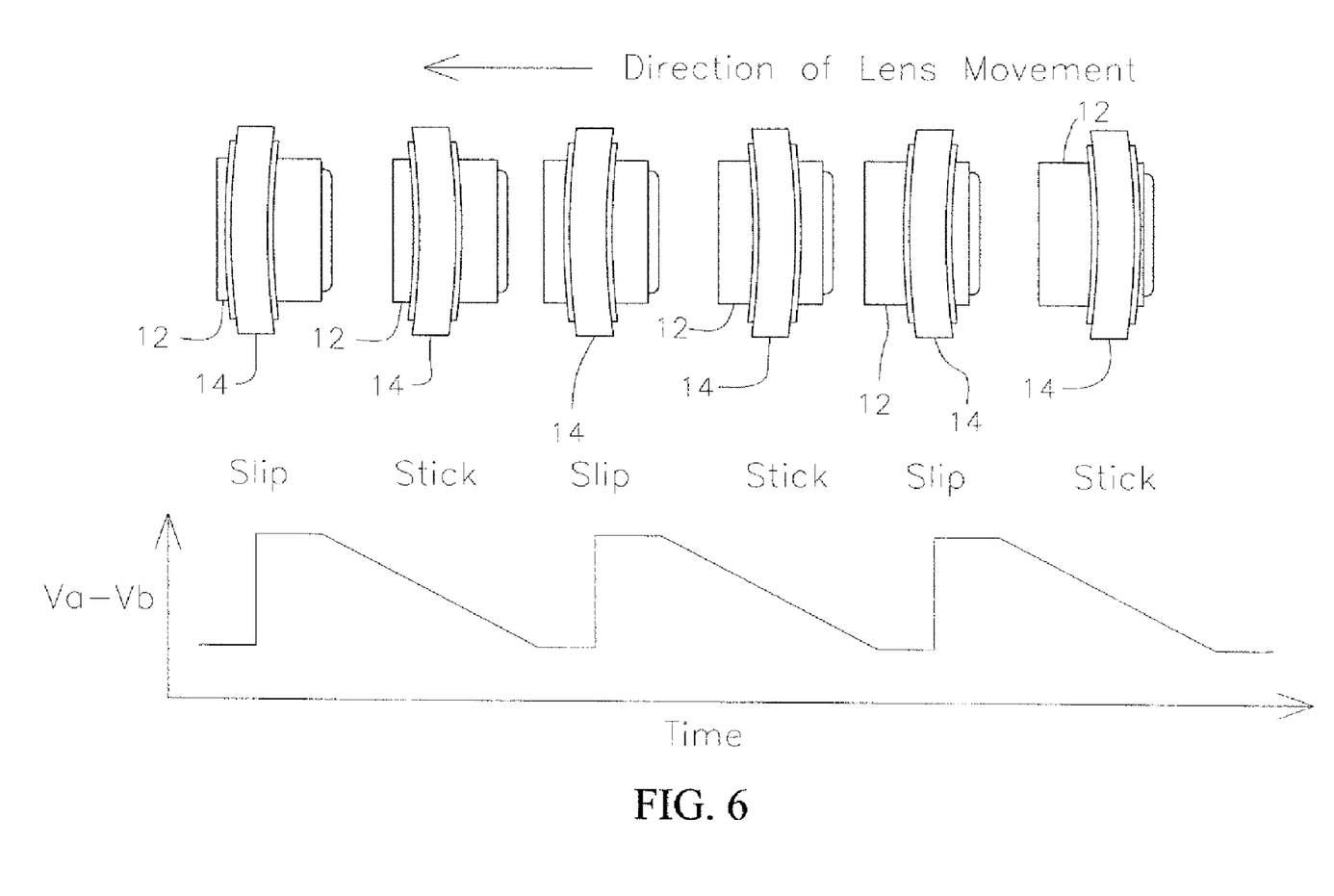
FIG. 6 is a timing diagram of a second drive waveform along with a series of side views illustrating the corresponding movement of the drive mechanism and the lens assembly.

By way of example only, timing diagrams of alternating asymmetric voltage waveforms along with a series of side views illustrating the corresponding slip and stick movement of the linear drive system 14 with respect to the lens assembly 12 in opposing directions are illustrated in FIGS. 5 and 6. In this example, a saw tooth waveform is show where the slower voltage rise or drop is the "stick" portion of the cycle and the fast voltage rise or drop is the "slip" portion of the cycle, although other types of waveforms which provide the "stick" portion and the "slip" portion could be used. As illustrated in FIGS. 5-6, the direction of motion of lens assembly 12 is determined by changing the orientation of the saw tooth waveform with drive control system 36.

The symmetric reaction forces and small size enable the linear drive system 14 to operate in the ultrasonic frequency range above 20,000 Hertz. In this particular embodiment, the range of ultrasonic operating frequencies is between about 20,000 Hz to about 70,000 Hz, although other operating frequencies can be used. To achieve an asymmetric vibration cycle with fast (slip) and slow (stick) portions, resonant vibrations which are fundamentally symmetric and do not generate net movement of lens assembly 12 should be avoided.

Accordingly, as illustrated and described herein present invention provides a linear drive system which effectively meets the radical size and cost reductions which are now required in a variety of different markets. Additionally, the present invention provides a linear drive system with not only reduced size, but also fewer parts which helps to reduce the overall cost of the linear drive system. Further, the present invention reduces operating power by eliminating the need for a separate position sensors, limit stops, or limit switches and in a digital camera applications helps to reduce power by holding the lens assembly using zero power. Even further, the present invention provides a linear drive system which is acoustically quieter than prior linear drive systems.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A drive system comprising:
   at least one actuator assembly that detachably engages a moveable system; and
   at least one control system which voltage biases the at least one actuator assembly in at least one direction at a first rate of acceleration which causes the at least one actuator assembly to slip with respect to the detachably engaged moveable system and in at least one other direction at a second rate of acceleration which causes the at least one actuator assembly to stick and move with respect to the detachably engaged moveable system,
   wherein the first rate of acceleration is sufficient to overcome the static friction between the actuator assembly and the detachably engaged moveable system, and the second rate of acceleration is insufficient to overcome the static friction between the actuator assembly and the detachably engaged moveable system.

2. The system as set forth in claim 1 wherein the at least one actuator assembly further comprises:
   at least two, spaced apart, piezoelectric actuator devices; and
   at least one force biasing system connected to the at least two piezoelectric actuator devices that biases the at least two piezoelectric actuator devices to detachably engage the moveable system.

3. The system as set forth in claim 2 wherein the at least two piezoelectric actuator devices further comprise:
   at least two, spaced apart guide rails; and
   at least two opposing piezoelectric plates on each of the guide rails.

4. The system as set forth in claim 3 wherein a poling direction in one piezoelectric plate on at least one of the guide rails is aligned opposite to a poling direction in the other piezoelectric plate on the at least one of the guide rails.

5. The system as set forth in claim 3 further comprising at least one guiding device on at least one of the guide rails that detachably engages with the moveable system.

6. The system as set forth in claim 2 wherein the at least one force biasing system further comprises at least two, spaced apart spring flexure devices connected to the at least two piezoelectric actuator devices.

7. The system as set forth in claim 3 wherein the at least two opposing piezoelectric plates are made of a piezoelectric material with dielectric loss factor of less than about 1 percent at ultrasonic frequencies above 20,000 Hz.

8. The system as set forth in claim 1 wherein the control system is an alternating asymmetric waveform voltage supply system.

9. The system as set forth in claim 1 wherein the moveable system is a lens assembly.

10. The system as set forth in claim 9 wherein the static friction is at least ten times greater than the mass of the lens assembly.

11. A method for making a drive system, the method comprising:
    providing at lease one actuator assembly that detachably engages a moveable system; and
    coupling at least one control system to the at least one actuator assembly, the at least one control system voltage biases the at least one actuator assembly in at least one direction at a first rate of acceleration which causes the at least one actuator assembly to slip with respect to the detachably engaged moveable system and in at least one other direction at a second rate of acceleration which causes the at least one actuator assembly to stick and move with respect to the detachably engaged moveable system,
    wherein the first rate of acceleration is sufficient to overcome the static friction between the actuator assembly and the detachably engaged moveable system, and the second rate of acceleration is insufficient to overcome the static friction between the actuator assembly and the detachably engaged moveable system.

12. The method as set forth in claim 11 wherein the providing the at least one actuator assembly further comprises:
    spacing apart at least two piezoelectric actuator devices; and
    connecting at least one force biasing system connected to the at least two piezoelectric actuator devices to force bias the at least two piezoelectric actuator devices to detachably engage the moveable system.

13. The method as set forth in claim 12 wherein the spacing apart at least two piezoelectric actuator devices further comprise:
    spacing apart at least two apart guide rails; and
    securing at least two opposing piezoelectric plates on each of the guide rails.

14. The method as set forth in claim 13 further comprising aligning a poling direction in one piezoelectric plate on at least one of the guide rails to be opposite a poling direction in the other piezoelectric plate on the at least one of the guide rails.

15. The method as set forth in claim 13 wherein the spacing apart at least two piezoelectric actuator devices further comprises providing at least one guiding device on at least one of the guide rails that detachably engages with the moveable system.

16. The method as set forth in claim 12 wherein the connecting at least one force biasing system further comprises connecting at least two, spaced apart spring flexure devices connected to the at least two piezoelectric actuator devices.

17. The method as set forth in claim 12 wherein the at least two opposing piezoelectric plates are made of a piezoelectric material with a dielectric loss factor of less than about 1 percent at ultrasonic frequencies above 20,000 Hz.

18. The method as set forth in claim 11 wherein the control system is an alternating asymmetric voltage waveform supply system.

19. The method as set forth in claim 11 wherein the moveable system is a lens assembly.

20. The method as set forth in claim 19 wherein the static friction is at least ten times greater than the mass of the lens assembly.

21. A method for driving a moveable system, the method comprising:
    detachably engaging a moveable system with at least one actuator assembly; and
    voltage biasing with at least one control system the at least one actuator assembly in at least one direction at a first rate of acceleration which causes the at least one actuator assembly to slip with respect to the detachably engaged moveable system and in at least one other direction at a second rate of acceleration which causes the at least one actuator assembly to stick and move with respect to the detachably engaged moveable system,
    wherein the first rate of acceleration is sufficient to overcome the static friction between the actuator assembly and the detachably engaged moveable system, and the second rate of acceleration is insufficient to overcome the static friction between the actuator assembly and the detachably engaged moveable system.

22. The method as set forth in claim 21 wherein the at least one actuator assembly further comprises:
    at least two, spaced apart, piezoelectric actuator devices; and
    at least one force biasing system connected to the at least two piezoelectric actuator devices that force biases the at least two piezoelectric actuator devices to detachably engage the moveable system.

23. The method as set forth in claim 22 wherein the at least two piezoelectric actuator devices further comprise:
    at least two, spaced apart guide rails; and
    at least two opposing piezoelectric plates on each of the guide rail.

24. The method as set forth in claim 23 wherein a poling direction in one piezoelectric plate on at least one of the guide rails is aligned to be opposite a poling direction in the other piezoelectric plate on the at least one of the guide rails.

25. The method as set forth in claim 23 further comprising at least one guiding device on at least one of the guide rails that detachably engages with the moveable system.

26. The method as set forth in claim 22 wherein the at least one force biasing system further comprises at least two, spaced apart spring flexure devices connected to the at least two piezoelectric actuator devices.

27. The method as set forth in claim 21 wherein the voltage biasing with at least one control system further comprising applying an alternating asymmetric voltage waveform to the at least one actuator assembly to voltage bias the at least one actuator assembly in the one direction and in the other direction.

28. The method as set forth in claim 21 wherein the moveable system is a lens assembly.

29. The method as set forth in claim 28 wherein the static friction is at least ten times greater than the mass of the lens assembly.

* * * * *